(No Model.)

T. D. BOTTOME.
INCANDESCENT ELECTRIC LAMP.

No. 445,688. Patented Feb. 3, 1891.

Alloy of Silver, Platinum & Nickels.

Witnesses:
Chas. K. Amor.
George E. Babcock

Inventor
Turner D. Bottome

UNITED STATES PATENT OFFICE.

TURNER D. BOTTOME, OF HOOSICK, NEW YORK.

INCANDESCENT ELECTRIC LAMP.

SPECIFICATION forming part of Letters Patent No. 445,688, dated February 3, 1891.

Application filed November 8, 1890. Serial No. 370,823. (No model.)

*To all whom it may concern:*

Be it known that I, TURNER D. BOTTOME, a citizen of the United States, and a resident of Hoosick, in the county of Rensselaer and State of New York, have invented certain new and useful Improvements in Sealing-In Wires for Incandescent Lamps, of which the following is a specification.

This invention relates to the manufacture of incandescent electric lamps; and it consists, essentially, in an electrical conductor composed of a comparatively inexpensive alloy that may be used as a conducting terminal for passing through a seal of glass and connecting with an incandescent-electric-lamp filament which is inclosed in a vacuous glass globe.

Hitherto in the manufacture of incandescent electric lamps that portion of wire passing through the glass bulb and upon which the seal is made has generally been composed of pure platinum or of an alloy of platinum and iridium; but although these metals are perfectly adapted for the purpose of being sealed in glass yet they are so expensive that their use very materially increases the cost of the incandescent lamp.

The base metals and various alloys have been used with a view of replacing the platinum metals in connection with incandescent lamps, but without commercial success. They either have had too low a melting-point or they have become coated with a superficial oxide when subjected to the heat necessary to effect a proper softening of the glass in making a seal. Such a coating of oxide prevents a seal from being vacuum-tight, a good vacuum being absolutely essential in producing a perfect incandescent lamp. Again, most metals and alloys do not have the same coefficient of expansion as glass. Hence such metals, when sealed in glass, cause the glass to crack when it cools, thus allowing air to be admitted into the bulb and destroying the vacuum.

The object of my invention is to produce a metallic conductor that is less expensive than the platinum metals, having the same coefficient of expansion as glass, and one that will not melt when subjected to the heat necessary to make a seal in glass, nor become coated with an oxide.

In the practical application of my invention reference may be had to the accompanying drawings, which form a part of this specification, in which—

Figure 1:
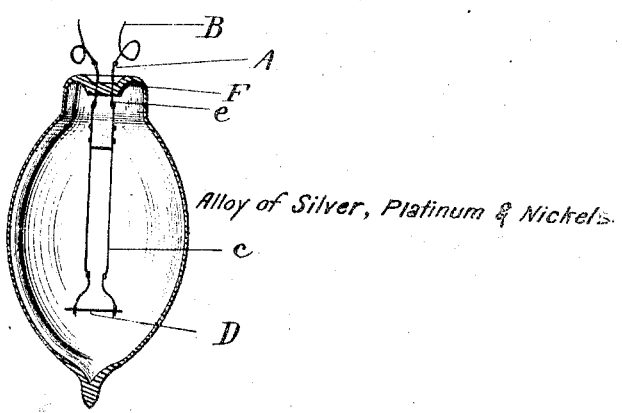
Figure 2:
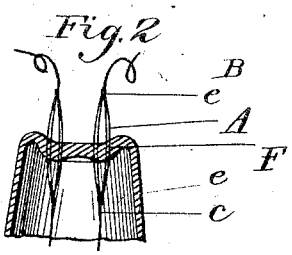

Figure 1 shows an incandescent electric lamp having leading-in wires B, that portion passing through the glass seal F being shown at A, the continuation of the wire to the filament D being shown by the wire C. In Fig. 2 is shown an enlarged section of the sealing-in wires, the portion of the wires passing through the glass seal F being shown by eight wires, in this case A, the external wires being joined to A at the point e and the internal wires C being joined to the wires A in a similar manner. It is obvious that the portions of wires B and C may be composed of cheaper metal than that used for passing through the glass seal F. For certain purposes I have found that a number of small wires of this composition passed through glass, instead of one large wire, give better results, and for that reason I prefer to use multiple wires when it is required to pass heavy electric currents through the lamp.

I have found a conductor that fulfills all of the above conditions. It is composed of pure nickel or cobalt alloyed with platinum and a small quantity of silver. For most practical purposes I find that the best results are obtained from the alloy when it contains the above metals in the following average proportions—namely: nickel or cobalt, eighty-four parts; platinum, fifteen parts, and silver one part, all by weight. These metals are melted together and granulated in the usual manner. The granulated alloy is then remelted a few times, or until the alloy has become perfectly uniform. It can then be readily drawn into wire to the size required for use.

I may here state that I do not limit my invention to the exact proportions of the metals in the alloy that I have given, because a small alteration in the quantity of any one of the metals will not prevent the alloy from serving the purpose. Thus I may have from one-fourth to five per cent. of silver and from five to thirty per cent. of platinum in the alloy and yet obtain my objects more or less perfect.

What I claim as my invention is as follows:

1. In the manufacture of incandescent electric lamps, a conductor composed of an alloy of silver, platinum, and nickel for electrically connecting with and hermetically sealing a filament in a glass bulb, substantially as described.

2. In the manufacture of incandescent electric lamps, an electrical conductor composed of an alloy of silver, platinum, and nickel or cobalt in the proportions described.

3. In the manufacture of incandescent electric lamps, an infusible non-oxidizable electrical conductor having the same coefficient of expansion as glass, consisting of an alloy of silver, platinum, and nickel or cobalt, as described.

Signed at Hoosick, in the county of Rensselaer and State of New York, this 13th day of September, A. D. 1890.

TURNER D. BOTTOME.

Witnesses:
GEO. H. MYERS,
CHAS. H. AMOR.